(12) United States Patent
Li et al.

(10) Patent No.: US 7,319,888 B2
(45) Date of Patent: Jan. 15, 2008

(54) METHOD OF MOBILE COMMUNICATION SYSTEM WITH SMART ANTENNA

(75) Inventors: Shihe Li, Beijing (CN); Guiliang Yang, Beijing (CN)

(73) Assignee: Huawei Technologies Co., Ltd. (CN)

( * ) Notice: Subject to any disclaimer, the term of this patent is extended or adjusted under 35 U.S.C. 154(b) by 58 days.

(21) Appl. No.: 10/508,669

(22) PCT Filed: Mar. 7, 2003

(86) PCT No.: PCT/CN03/00173

§ 371 (c)(1),
(2), (4) Date: Sep. 22, 2004

(87) PCT Pub. No.: WO03/081820

PCT Pub. Date: Oct. 2, 2003

(65) Prior Publication Data

US 2005/0152303 A1    Jul. 14, 2005

(30) Foreign Application Priority Data

Mar. 27, 2002    (CN) .................................. 02116509

(51) Int. Cl.
*H04M 1/00* (2006.01)
(52) U.S. Cl. .................. 455/562.1; 455/450; 455/451; 455/452.1; 455/517
(58) Field of Classification Search ............. 455/562.1; 370/342; 375/224
See application file for complete search history.

(56) References Cited

U.S. PATENT DOCUMENTS 5,490,168 A    2/1996  Phillips et al.
6,031,831 A    2/2000  Tan Boon et al.
6,731,954 B1 *  5/2004  Katz .................. 455/562.1

FOREIGN PATENT DOCUMENTS

CN    1 165 458 A    11/1997

* cited by examiner

*Primary Examiner*—Lester G. Kincaid
*Assistant Examiner*—Charles Shedrick

(57) ABSTRACT

The invention discloses a method for transmitting high-speed downlink package data in a mobile communication system with a smart antenna, which not only can take full advantage of radio beamforming of smart antenna but also can transmit downlink package data high efficiency. In this method, at the beginning of downlink package data transmission, no matter whether a subscriber terminal is at any state, a call for all ready subscriber terminal is made through a paging channel to obtain an initial DOA (direction of arrival) of every subscriber terminal, and then with this initial DOA the smart antenna transmits downlink package data to a subscriber terminal with an initial beamforming; having received one package, the subscriber terminal returns an acknowledgement message, if the downlink package is correctly received, or retransmission is required, if the received downlink package has error codes, so the system knows current position of the subscriber terminal and can use an updated beamforming to trace the subscriber terminal moving; based on received package quality, the system adaptively adjusts the length of a downlink package, and based on the moving speed of the subscriber terminal, the system adaptively adjusts the length of the downlink package too.

4 Claims, 4 Drawing Sheets

METHOD OF MOBILE COMMUNICATION SYSTEM WITH SMART ANTENNA

FIELD OF THE TECHNOLOGY

The invention relates generally to the mobile communication field, more specifically, to a method that not only can take full advantage of radio beamforming of smart antenna, but also can transmit downlink package data high efficiency in mobile communication system with smart antenna.

BACKGROUND OF THE INVENTION

In the future mobile communication system, transmission of high-speed downlink package data, i.e. data with Internet type, is an important service; the mobile communication system transmits this kind subscriber data based on the subscriber requirement.

The present implementation method of this transmission may be described by taking a method in General Packet Radio Service (GPRS) of a Globe System for Mobile communication (GSM). The method works as follows: all accessed subscribers are in the ready state, i.e. connect to a network; the radio base station uses one carrier, and with one or multiple time slots of this carrier, the downlink data are sent to the subscriber terminal one by one in an omni-directional emission mode that covers one cell or one sector of the base station in order to guarantee that no matter whether the subscriber terminal moves to any position within the covered area, the downlink data can be received. In this case, a base station does not need to know a subscriber terminal position, but only the cell where the subscriber is.

In order to guarantee transmission quality of the downlink data, the ARQ (Automatic Request for Repetition) technique is used in general; that is as follows: while making transmission of downlink data every time, the base station transmits a package having a specific length to the subscriber terminal; having received the package, the subscriber terminal detects whether the received package has error codes using error correction and/or error detection technique (such as redundant correcting technique); when the received package has error codes and cannot be corrected, the subscriber terminal will ask the base station to transmit the package repeatedly.

FIG. 1 shows a typical flow that a base station transmits downlink package data to a subscriber terminal. The mobile communication system knows that: the subscriber terminals 11, 12, . . . 1N are all located at the cell of the base station B, and they are all in a ready state (such as the READY state in GPRS); according to the system signaling, the base station B transmits downlink package data to the terminals 11, 12, . . . 1N sequentially. The head of each package has a subscriber terminal identification, and the package length is determined by the system (usually it is a fixed length that is length of multiple radio frames).

As shown in FIG. 1, the base station B transmits a high-speed downlink package data to subscriber terminal 13 in an omni-directional mode; having received a package, subscriber terminal 13 returns an acknowledgement or an ARQ; then the base station B and subscriber terminal 13 enter the same transmission and acknowledgement procedure of the packages until transmission of the downlink package data from the base station B to subscriber terminal 13 of this time is finished. Then sequentially, the base station B transmits high-speed downlink package data to second subscriber terminal 11; having received an ARQ from the subscriber terminal 11, the base station B transmits the package again in an omni-directional mode; then the base station B and subscriber terminal 11 enter the repeated transmission and acknowledgement procedure of packages until transmission of the downlink package data from the base station B to subscriber terminal 11 of this time is finished.

In another development, the modern mobile communication system applies smart antenna technique, which greatly improves system capacity and performance and reduces system cost.

The basic principle of smart antenna is that: with a received uplink signal from a subscriber terminal, a base station determines the direction of arrival (DOA) of the subscriber terminal, and, beamforming the uplink signal based on the DOA, the base station make directional emission of downlink data to the subscriber terminal.

Obviously, since a base station does not know DOA of a subscriber terminal and if it applies the continuous mode to transmit downlink package data for every subscriber terminal, as mentioned above, only an omni-directional beam can be used; in this case, the advantage of downlink beamforming of smart antenna has not been taken.

Nevertheless, a subscriber terminal is usually moving; for taking advantages of smart antenna, a system must know the current position of every accessed subscriber terminal to guarantee that downlink beamforming is tracking a moving subscriber terminal correctly.

Up till now, there is no solution for the above problems.

SUMMARY OF THE INVENTION

Objective of the invention is to provide a method for transmitting high-speed downlink package data in mobile communication system with smart antenna. The method should take the advantage of smart antenna but without occupying too much system resources.

The invention is implemented with the following technique scheme:

A method for transmitting high-speed downlink package data in a mobile communication system with a smart antenna, comprises, A. a radio base station with the smart antenna obtaining initial direction of arrival (DOA) information of every subscriber terminal that is ready for receiving the high-speed downlink package data;

B. according to the initial DOA information of every subscriber terminal, the radio base station making downlink beamforming;

C. the radio base station taking a preset length L as the downlink package length, directionally transmitting the downlink package data with the length of the downlink package as a unit to a current subscriber terminal, based on the beamforming for the current subscriber terminal;

based on two uplink acknowledgement messages of the current subscriber terminal, the radio base station obtaining its DOA information and time-delay changes of arrivals;

based on position changes of current subscriber terminal at two moments, the radio base station calculating a moving speed of current subscriber terminal;

the radio base station decreasing the downlink package length for the subscriber terminal with a faster moving speed, and increasing the downlink package length for the subcriber terminal with a slower moving speed;

D. after having received one downlink package, the current subscriber terminal detecting error codes of the said downlink package, and through a uplink channel the current subscriber terminal returning an acknowledgement to show whether the current downlink package is received correctly or exists error codes in which a retransmission is required;

E. based on the acknowledgement message, the radio base station obtaining new DOA information of the current subscriber terminal;

according to the said new DOA information of the current subscriber terminal, the radio base station making a new downlink beamforming, and transmitting next downlink package with the new downlink beamforming if the current downlink package is correctly received, or retransmitting the current downlink package if the subscriber terminal requires retransmission; and so forth until the current subscriber terminal has correctly received all downlink packages.

according to the said new DOA information of the current subscriber terminal, the radio base station making a new downlink beamforming, and transmitting next downlink package with the new downlink beamforming if the current downlink package is correctly received, or retransmitting the current downlink package if the subscriber terminal requires retransmission; and so forth until the current subscriber terminal has correctly received all downlink packages.

Wherein step A comprises, the radio base station making a call to the subscriber terminals that are ready for receiving the high-speed downlink package data through a paging channel in an omni-directional or sectored beam and obtaining the initial DOA information of every subscriber terminal from its acknowledgement message.

In steps C to E, wherein the radio base station respectively transmits downlink package data to all subscriber terminals that are ready to receive the downlink package data one by one; after the current subscriber terminal has sequentially received all downlink packages correctly, the radio base station sequentially transmits downlink package data to next subscriber terminal.

In the technical scheme of the invention, when a base station is ready to transmit downlink package data to every subscriber terminal, the base station must contact with the subscriber terminal through the paging channel no matter whether the subscriber terminal is at an idle state, a communication state or a receiving data state, i.e. a call-response procedure, and having received responses from the subscriber terminals, the base station makes data transmission. This means that even a subscriber terminal is in a working state, the transmission cannot be happened directly. This procedure is similar to a handshake procedure, and a link between the base station and a subscriber terminal that is ready to receive the downlink package data is established. Therefore, the base station knows the subscriber terminal initial DOA, and the smart antenna system can make downlink beamforming with the DOA information. Then, transmission of downlink package data is started.

In the technical scheme of the invention, during transmission of the downlink data, a single package is taken as a unit for transmission, and packages are sequentially transmitted to a subscriber terminal. Having received a downlink package, no matter whether it is correct or error, the subscriber terminal should acknowledge through the uplink channel, and the base station can obtain a new DOA of the subscriber terminal from the acknowledgement messages. Based on the new DOA of the subscriber terminal, a new beamforming is made, in order that the beamforming traces the subscriber terminal moving. With this new beamforming, the base station transmits next downlink package, if the current downlink package is received correctly, or the base station retransmits the current downlink package data if errors cannot be corrected in the current received downlink package.

In a synchronous CDMA system, such as TD-SCDMA, through the method of the invention, a base station knows the distance of a subscriber terminal, so it can make synchronization of uplink signal and control of emitting power.

During transmission procedure of high-speed downlink package data, a variable length of a downlink package is applied. When a base station with smart antenna transmits downlink package, every downlink package is transmitted according to a downlink beamforming, and the base station makes beamforming based on the uplink acknowledgement signals. It is possible that a subscriber terminal is in different moving states. When the moving speed is faster, it is possible that the subscriber terminal position is changed greatly within transmission duration of a downlink package data, especially, the propagation environment of radio wave is changed greatly; in this case, a downlink package with a fixed length is difficult to be received correctly even it is retransmitted in multiple times. When this situation happens, usually it is difficult to be solved by conventional manners, such as increasing redundant correcting or adjusting encode rate etc.

The method of the invention takes an adaptive way to change the length of a downlink package. The adaptive way is as follows: during downlink data transmission, at the beginning a longer length of a downlink package is taken to decrease the times of uplink acknowledgements and to rise the system efficiency; when a uplink acknowledgement shows that there is a serious error situation after one package is received by the subscriber terminal, for example, the package cannot be correctly received in case of two or three times of retransmission, the length of a downlink package is decreased immediately, such as taking half of the original length, and then retransmission is made again; and so forth until the downlink package is correctly received by the subscriber terminal.

For a TD-SCDMA system, the shortest length of a downlink package is one time-slot of a data frame, and for other system the shortest length of a downlink package is a radio frame.

Adaptively changing the length of a downlink package is to speed up the procedure that the beamforming of smart antenna is tracing the subscriber terminal moving speed, so that the maximum capability of the system and the smart antenna are got. When quality of the received package is better, the length of a downlink package data can be doubled and so forth. In this way, functions of the smart antenna can be brought into play and system efficiency can be improved.

Obviously, if the subscriber terminal moving speed is known, the adjusting procedure of the length of a downlink package will be quicker and more effective, since during the subscriber terminal is moving with a higher speed the radio wave propagation condition is worse and the error code probability is higher. For a synchronous CDMA system, such as TD-SCDMA, a base station with smart antenna can obtain the moving speed of a subscriber terminal with the specific way as follows: based on the two uplink acknowledgement signals, the base station obtains the DOA and changes of the time-delay in the duration, so position change of a subscriber terminal is known; with these information, the moving speed of the subscriber terminal can be calculated; the moving speed of the subscriber terminal can be used as another basis to determine the length of a downlink package, which means that if the moving speed is fast, the length of a downlink package is decreased, and if the moving speed is slow, the length is increased.

EMBODIMENTS OF THE INVENTION

The invention will be described in more detail with reference to drawings.

Figure 1:
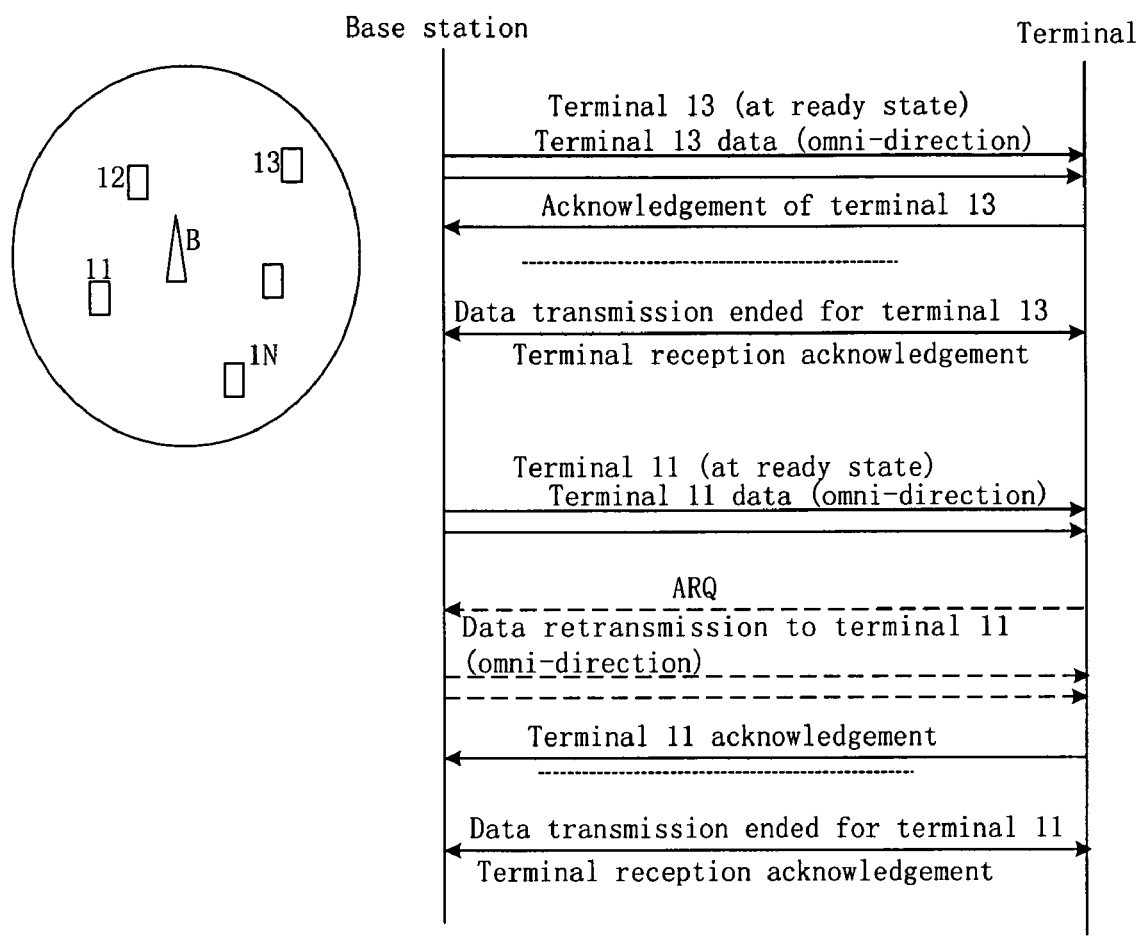
FIG. 1 shows a high-speed downlink package data transmission with a conventional method.
Figure 2:
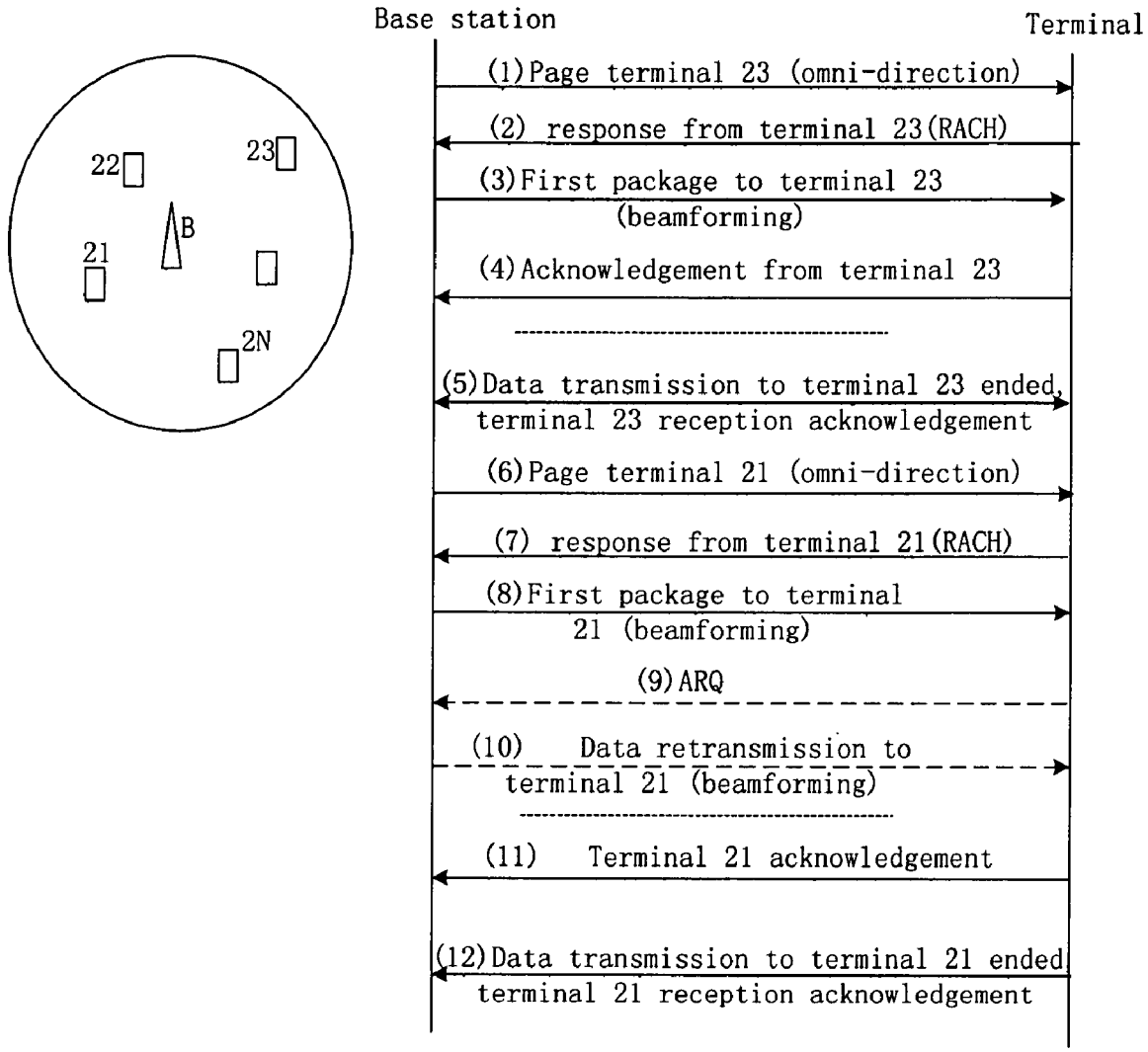
FIG. 2 shows transmission procedure of the invention for downlink package data for a mobile communication system with smart antenna.

In FIG. 2, a mobile communication system with smart antenna knows that the subscriber terminals 21, 22, ... 2N are all in the cell of base station B and at a ready state, but the system does not know the specific position (DOA) of these subscriber terminals.

When a radio base station with smart antenna transmits downlink package data to a subscriber terminal, the following steps are taken:

Step (1), based on system signaling, while the base station B makes transmission of downlink package data to subscriber terminal 23, 21, ... 2N sequentially, first it calling first subscriber terminal 23 in a paging channel with omnidirectional or sectored beam;

Step (2), having received the call, the called subscriber terminal 23 making an acknowledgement through a reverse access channel (RACH);

Step (3), after the call and response are successful, based on the received DOA of subscriber terminal 23 the base station transmitting first high-speed downlink package to subscriber terminal 23 in a beamforming through a downlink service channel;

Step (4), having received the first downlink package, subscriber terminal 23 making error correction/error detection, i.e. checking whether there are error codes in the first downlink package; if there is no error code, the subscriber terminal 23 returning an acknowledgement about a correct reception to the base station; if there are error codes that are uncorrectable, an ARQ being returned to the base station;

Step (5), then, based on the uplink acknowledgement signal of subscriber terminal 23 the base station being able to obtain a new DOA of subscriber terminal 23, and then transmitting the next package when last package is correctly received or the last package data when last package cannot be correctly received, to the subscriber terminal; and so forth until every downlink package has been received correctly, i.e. the whole procedure, in which the base station transmits all packages of downlink data to subscriber terminal 23 and subscriber terminal 23 returns receiving acknowledgements of every package to the base station.

Step (6) to (12) are steps that makes transmission and acknowledgement procedure between the base station and second subscriber terminal 21 which is similar as what have been described above, wherein steps (9) and (10) are the situation that the subscriber terminal 21 receives a error package and returns an ARQ to the base station, and the base station retransmits the package with an updated beamforming.

Figure 3:
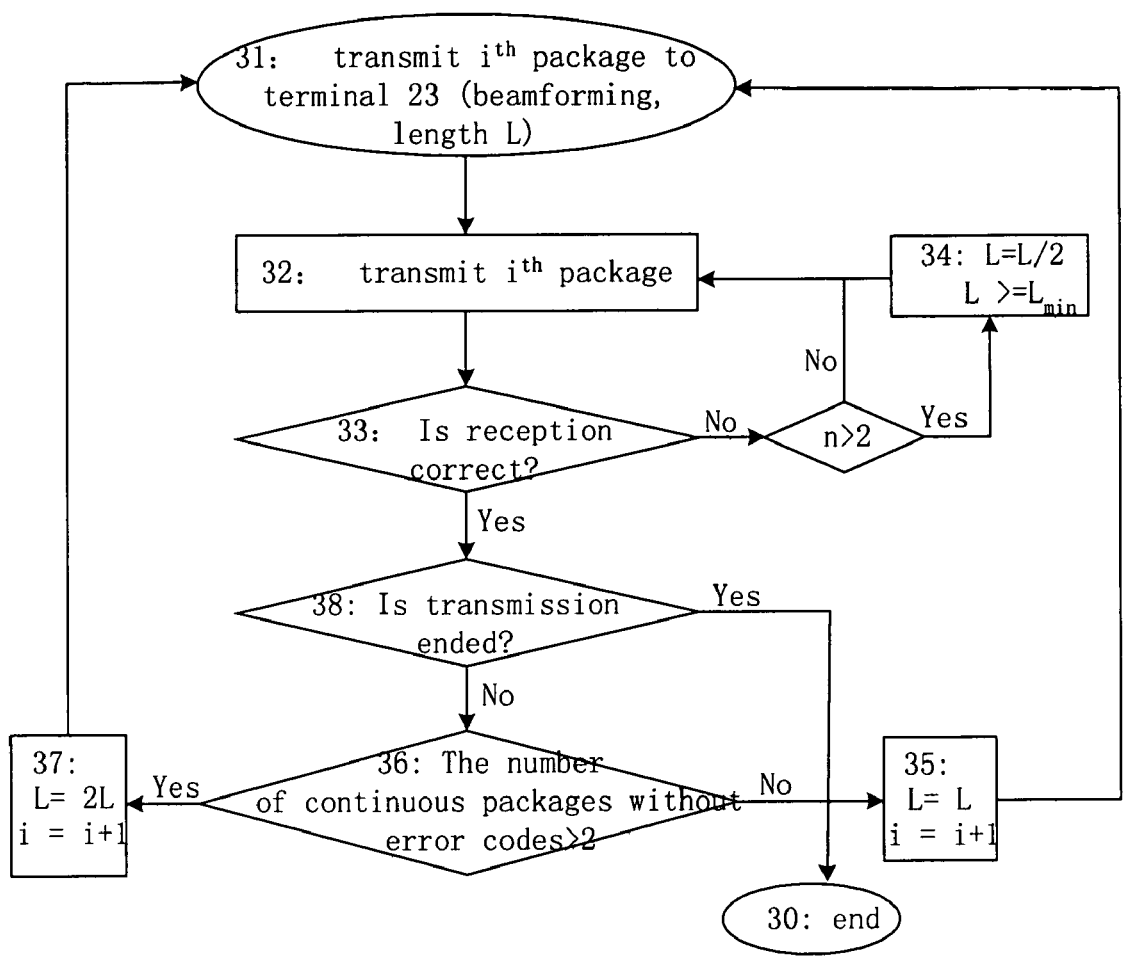
FIG. 3 shows a transmission flowchart of an adaptive length of downlink package.

FIG. 3 shows a procedure that a base station adaptively adjusts the length of a downlink package. Taking the procedure of transmitting packages to subscriber terminal 23 in FIG. 2 as an example, the method of the adjustment procedure comprises the following steps of:

Steps 31 and 32, the base station transmitting the $i^{th}$ package to subscriber terminal 23 with the beamforming and length L of the $(i-1)^{th}$ package i.e. the last package;

Step 33, having transmitted the $i^{th}$ package, the base station obtaining the acknowledgement message through uplink channel; if the reception is correct, the transmission being confirmed, otherwise the $i^{th}$ package is retransmitted and the retransmission time n is recorded;

Step 34, before retransmission, detecting whether the retransmission time n is equal to or greater than a preset number, such as 2 or 3; when the retransmission time n is equal to or greater than the preset number, the length of the package to be transmitted being taken as half length of the original, i.e. L=L/2, but not less than a minimum length $L_{min}$ (the shortest length is one time slot in a frame or one radio frame);

then Step 32 making retransmission with the L/2 length; when the retransmission time n is not equal to or greater than the preset number, the base station executing Step 31 directly to retransmit the $i^{th}$ package with length L;

Step 38, when $i^{th}$ package has been correctly received by the subscriber terminal, the number of consecutive non-error package m being recorded, and the system further detecting whether the transmission of downlink package data is ended; if it is ended, returning to Step 30 to end procedure of transmitting package data to the subscriber terminal 23, otherwise Step 36 is executed;

Step 36, detecting whether the consecutive non-error package m is equal to or greater than a preset number, such as 2 or 3, i.e. whether the preset number of package has been correctly received by subscriber terminal 23 without retransmission;

Step 37, when m is equal or greater than the preset number, the length of a package to be transmitted being double, i.e. the length 2L being taken for transmission of $(i+1)^{th}$ package;

Step 35, when m is less than the preset number, the length of a package to be transmitted keeping the same length L, and returning to Step 31 for transmission of $(i+1)^{th}$ package.

Figure 4:
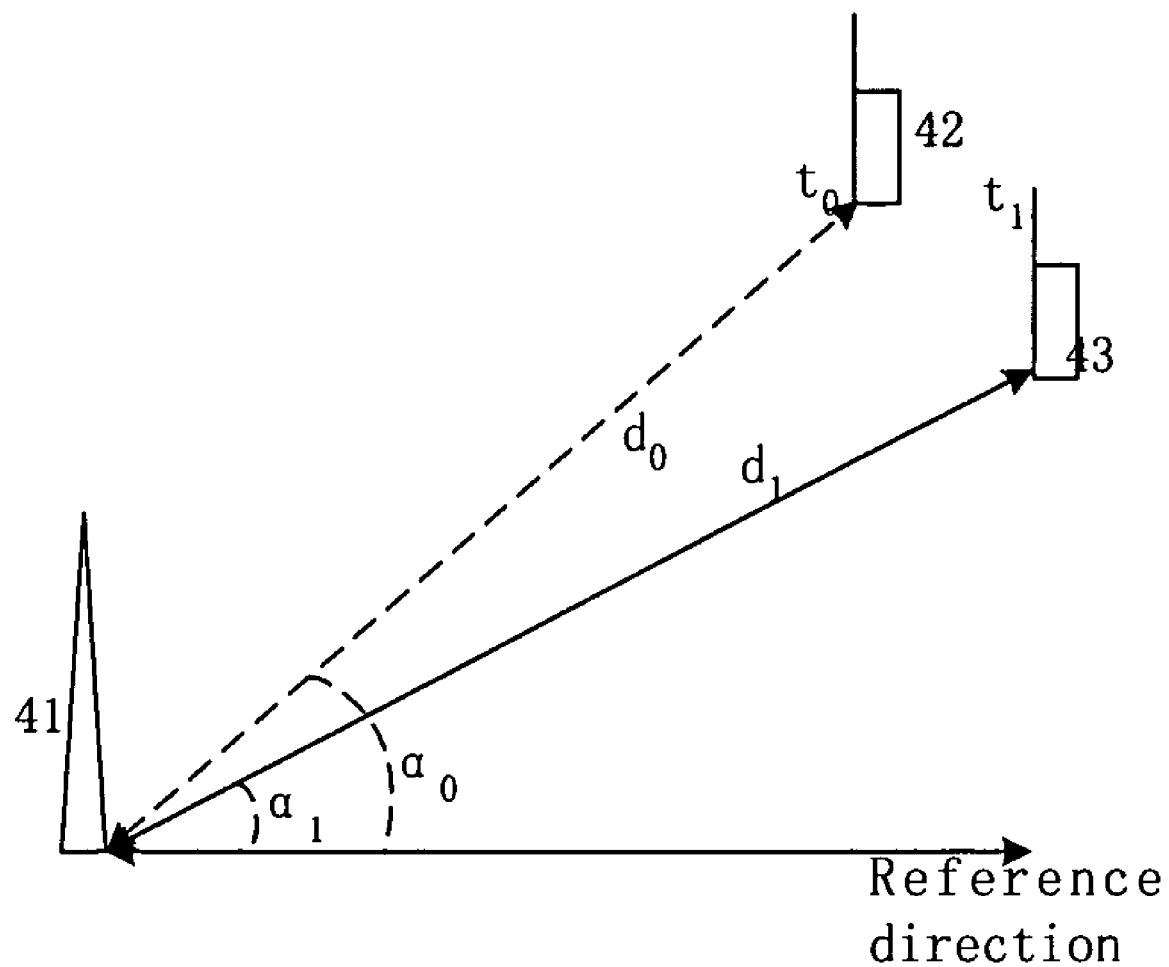
FIG. 4 shows principle of calculating moving speed of a subscriber terminal.

FIG. 4 shows a method to define moving speed of a subscriber terminal in order to adjust length of a package to be transmitted adaptively; wherein 41 is a base station, 42 and 43 are subscriber terminal positions at moments $t_0$ and $t_1$, respectively.

Through measuring the DOA and distance twice, the base station can roughly calculate the moving speed of the subscriber terminal during transmitting downlink package data, base on the mature technology of which a synchronous CDMA system, such as TD-SCDMA, can obtain the DOA of a subscriber in commutation state and distance to a base station. The base station will set a shorter length of a downlink package for the subscriber terminal with faster moving speed, and a longer length of a downlink package for the subscriber terminal with slower moving speed.

Suppose at the moment $t_0$, the subscriber terminal is at position 42 that has a DOA $a_0$ referring to the reference direction in the figure and a distance $d_0$ to the base station 41; at the moment $t_1$, the subscriber terminal is at position 43 that has a DOA $a_1$ referring to the reference direction in the figure and a distance $d_1$ to base station 41, then during $t_0$ to $t_1$ duration, the subscriber terminal moving speed v is:

$$v = \frac{\sqrt{d_0^2 + d_1^2 - 2d_0 d_1 \cos(\alpha_0 - \alpha_1)}}{(t_1 - t_0)}$$

Since circumstance of a mobile communication system is very complex, for example, in an urban area there are streets and buildings, which make radio reflection more complex, and also a subscriber terminal cannot move quickly, so the invention does not suggest using the above speed measurement method to adjust the length of a downlink package; but in a suburb or any open area the above speed measurement method can be used as a basis to determine the initial length of a downlink package and has a better result.

The method proposed by the invention can be used in a FDD (Frequency Division Duplex), TDD (Time Division Duplex), CDMA or TDMA mobile communication system.

The invention claimed is:

1. A method for transmitting high-speed downlink package data in a mobile communication system with a smart antenna, comprising,
    A. a radio base station with the smart antenna obtaining initial direction of arrival (DOA) information of every subscriber terminal that is ready for receiving the high-speed downlink package data;
    B. according to the initial DOA information of every subscriber terminal, the radio base station making downlink beamforming:
    C. the radio base station directionally taking a preset length L as the downlink package length, transmitting the downlink package data with a length of a downlink package as a unit to a current subscriber terminal, based on the beamforming for the current subscriber terminal;
    based on two uplink acknowledgement messages of the current subscriber terminal, the radio base station obtaining its DOA information and time-delay changes of arrivals;
    based on position changes of current subscriber terminal at two moments, the radio base station calculating a moving speed of current subscriber terminal;
    the radio base station decreasing the downlink package length for the subscriber terminal with a faster moving speed, and increasing the downlink package length for the subscriber terminal with a slower moving speed;
    D. after having received one downlink package, the current subscriber terminal detecting error codes of the said downlink package, and through a uplink channel the current subscriber terminal returning an acknowledgement to show whether the current downlink package is received correctly or exists error codes in which a retransmission is required;
    E. based on the acknowledgement message, the radio base station obtaining new DOA information of the current subscriber terminal;
    according to the said new DOA information of the current subscriber terminal, the radio base station making a new downlink beamforming, and transmitting next downlink package with the new downlink beamforming if the current downlink package is correctly received, or retransmitting the current downlink package if the subscriber terminal requires retransmission; and so forth until the current subscriber terminal has correctly received all downlink packages.

2. The method according to claim 1, wherein step A comprises, the radio base station making a call to the subscriber terminals that are ready for receiving the high-speed downlink package data through a paging channel in an omni-directional or sectored beam and obtaining the initial DOA information of every subscriber terminal from its acknowledgement message.

3. The method according to claim 2, wherein the subscriber terminals include those terminals that are in an idle state or in any working state but are ready to receive the downlink package data.

4. The method according to claim 1, wherein the radio base station respectively transmits downlink package data to all subscriber terminals that are ready to receive the downlink package data one by one; after the current subscriber terminal has sequentially received all downlink packages correctly, the radio base station sequentially transmits downlink package data to next subscriber terminal.

* * * * *

UNITED STATES PATENT AND TRADEMARK OFFICE
CERTIFICATE OF CORRECTION

PATENT NO. : 7,319,888 B2  Page 1 of 1
APPLICATION NO. : 10/508669
DATED : January 15, 2008
INVENTOR(S) : Shihe Li et al.

It is certified that error appears in the above-identified patent and that said Letters Patent is hereby corrected as shown below:

In the Title Page:

(73) Assignee: "Huawei Technologies Co., Ltd (CN)" should be --Da Tang Mobile Communications Equipment Co., Ltd. (CN)--

Signed and Sealed this

Eighteenth Day of August, 2009

David J. Kappos
*Director of the United States Patent and Trademark Office*